(12) United States Patent
Chen

(10) Patent No.: US 7,620,484 B1
(45) Date of Patent: Nov. 17, 2009

(54) AUTOMOTIVE MOBILE DIAGNOSTICS

(76) Inventor: Ieon C. Chen, 17291 Mt. Herrmann St., Fountain Valley, CA (US) 92708

( * ) Notice: Subject to any disclaimer, the term of this patent is extended or adjusted under 35 U.S.C. 154(b) by 21 days.

(21) Appl. No.: 12/156,416

(22) Filed: Jun. 2, 2008

(51) Int. Cl.
*G01M 17/00* (2006.01)
(52) U.S. Cl. .............................. 701/29; 701/33; 701/35
(58) Field of Classification Search ............. 701/29.31, 701/32, 33, 35; 340/438, 439; 705/28
See application file for complete search history.

(56) References Cited

U.S. PATENT DOCUMENTS

| | | | | |
|---|---|---|---|---|
| 6,529,808 | B1 * | 3/2003 | Diem ........................... | 701/29 |
| 6,925,368 | B2 * | 8/2005 | Funkhouser et al. .......... | 701/33 |
| 7,356,394 | B2 * | 4/2008 | Burgess ....................... | 701/33 |

* cited by examiner

*Primary Examiner*—Richard M. Camby
(74) *Attorney, Agent, or Firm*—Neil John Graham

(57) ABSTRACT

The invention generally relates to vehicle diagnostic systems and their methods of use, and more particularly, to a handheld automotive diagnostic code-reader/scan tool with data link connector (DTC) which straps to the user's arm and is comprised of a touch screen, a VIN bar code/number scanner, a credit card reader, a printer, and internet and cell phone connections to a variety of servers for credit card approval, billing and vehicle diagnostics. The credit card is scanned and billed followed by scanning the vehicle VIN number or bar code and sending the information to the vehicle OBD2 server who identifies the vehicle, orders the handheld tool to perform certain tests upon the vehicle and in turn performs a diagnosis. A live wireless cell phone connection may be made, if necessary, with a technician at the OBD2 server for tech support. Test results are returned to the hand tool which prints out the results, prints a credit card receipt and sends a record of the transaction to the operators server Corp. for record keeping.

20 Claims, 5 Drawing Sheets

AUTOMOTIVE MOBILE DIAGNOSTICS

FIELD OF THE INVENTION

The invention generally relates to a mobile vehicle diagnostic system and more particularly to a hand-held automotive diagnostic code-reader/scan tool which also comprises a touch screen, a VIN bar code/number scanner, a credit card reader, a printer, an internet connection and a wireless cell phone with a microphone/speaker. The tool allows a remote server to identify the vehicle and diagnose the problem and give an estimate of the cost of repairs. A credit card may also be charged.

BACKGROUND OF THE INVENTION

Vehicle manufacturers began to use electronic systems to control engine functions and diagnose engine problems in an attempt to meet federal emissions standards set up by the Environmental Protection Agency (EPA) between 1970 and 1990. The California Air Resources Board (CARB) approved a set of regulations requiring vehicles to be equipped with On-Board Diagnostic (OBD) systems to control and regulate emission and engine-control related components in the mid-1980s. The OBD system included circuitry and other electro-mechanical components that recorded engine and emission-related malfunctions using diagnostic trouble codes (DTCs). Stored in memory, the DTCs could later be retrieved by technicians to quickly determine the direct cause of the malfunctions and make necessary repairs.

OBD systems installed on vehicles included, among other things, an engine control module that monitored the engine controls and emission related components, a malfunction indicator lamp (MIL) located on an instrument panel and other supporting circuitry and memory. When a malfunction was detected by the OBD system, the MIL illuminated to provide notice to the vehicle operator of an engine or emissions malfunction. At the same time, the OBD system stored in memory the DTCs corresponding to the specific malfunction detected.

In addition to standard tailpipe testing equipment which measured exhaust output and content, state emission testing facilities were subsequently equipped with OBD equipment that connected to the OBD system of a vehicle and retrieved stored DTCs by way of a data link connector (DLC). By retrieving the DTCs stored by OBD systems, the vehicle's road-worthiness could be determined.

In the late 1980's and early 1990's California developed and approved a new set of regulations, a second generation OBD system (OBD-II) for use in newly manufactured vehicles. OBD-II built upon the first generation OBD system and incorporated various technical advancements including, among other things, the ability to monitor engine misfires and catalysts efficiencies. Although the first and second generation of OBD regulations were originally only required in California, Federal emission regulations quickly followed. Operating under the framework of the Clean Air Act of 1990, the EPA adopted California's OBD-II regulations in the mid-1990s and required certain vehicles manufactured in 1996 and later to be equipped with OBD-II systems. In addition to requiring OBD-II systems, the Clean Air Act requires states to perform vehicle checks of OBD-II systems by way of mandatory programs which read generated DTCs and indicate whether the vehicle is safe and robust in terms of today's emission control standards. As of 1998, the EPA adopted new Federal OBD-II standards based on California's OBD-II regulations for certain newly manufactured vehicles.

As emission and engine maintenance technology has improved from the 1970s to the present, Federal and State governments have adopted new technologies to measure vehicle emissions and keep our vehicles cleaner and safer. As a result of first and second generation OBD systems, tailpipe analyzer tests and legacy equipment are no longer required for vehicles manufactured in 1996 and later. While emissions testing has become standard across the United States, state-run facilities generally include complicated testing protocols and methodologies and expensive and mandated ancillary equipment to read and interpret DTCs. While individual vehicle owners may utilize state-run facilities to receive feedback based upon their vehicle's emissions and engine performance, the inspection and maintenance programs are generally not required for each vehicle until a vehicle reaches a prescribed age. Because state facilities are generally not available to the casual user or are inconveniently located, private manufacturers have marketed custom software and hardwired OBD testing equipment. A need exists for OBD testing equipment which features state-of-the-art cost efficient equipment allowing user-friendly testing processes and to be highly mobile, such as a handheld unit. An example would be a tow truck with a broken down vehicle where the tow truck operator could scan the vehicle to identify the vehicle, connect to the internet and retrieve diagnostic information, scan the vehicle owner's credit card and obtain approval via the internet and print a receipt for the driver and a printout of the automobile diagnosis and printout of the repair necessary.

SUMMARY OF THE INVENTION

The present invention is directed to an automotive mobile diagnostics which is handheld device mounted to the back of an operator's arm. The automotive mobile diagnostics is an OBD2 automotive code reader/scanner with a wireless cell phone and a wireless internet connection. The automotive mobile diagnostics is further comprised of a manual input touch screen, a bar code/number scanner, a credit card scanner, an internal printer with paper, a speaker/microphone and a rolled up DLC cable for linking with a vehicle on-board computer. The automotive mobile diagnostics is designed to use a host OBD2 server for tech support, which includes live tech support where the operator may talk with technician at the same time.

The automotive mobile diagnostics is best understood by its use. The automotive mobile diagnostics, upon activation, is used to scan the customer's credit card and make an internet connection with the internet credit card server who processes the credit card, charges the account and sends a receipt to the automotive mobile diagnostics which prints a receipt for the customer. The automotive mobile diagnostics VIN scanner is then used to scan the vehicle VIN bar code or number. The VIN number may also be entered manually. The automotive mobile diagnostics then makes a wireless connection with the OBD2 server and sends the VIN information. The OBD2 server then sends the vehicle information back to the automotive mobile diagnostics wherein the DTC cable is then connected to the vehicle on-board computer and the vehicle key is turned on. The vehicle test information, including live data tests the OBD2 server may have ordered, is then sent to the OBD2 server. During this period of time the automotive mobile diagnostics makes a live wireless cell phone connection, if necessary, with a technician at the OBD2 server for tech support. The automotive mobile diagnostics receives the fix back from the server which is then printed out. A fix estimate may also be received. The automotive mobile diagnostics makes an internet connection with the operator's Corp. server and transmits all the transaction information for record keeping. As a follow-up the automotive mobile diagnostics may be used to contact a service repair shop and transmit the customer's name and the automotive information.

DETAILED DESCRIPTION OF A PREFERRED EMBODIMENT

The present disclosure relates to a method and apparatus for testing vehicle emissions and engine controls using a hand held OBD with the additional ability to scan the vehicle VIN number to identify the vehicle, scan a credit card and obtain approval over the internet or cell phone, print a receipt and retrieve internet diagnosis of the vehicle' problem. In the following detailed description, numerous specific details are set forth in order to disclose and understand the invention. Structures, interfaces and processes apparent to one of ordinary skill in the art have not been shown in detail.

Figure 1:
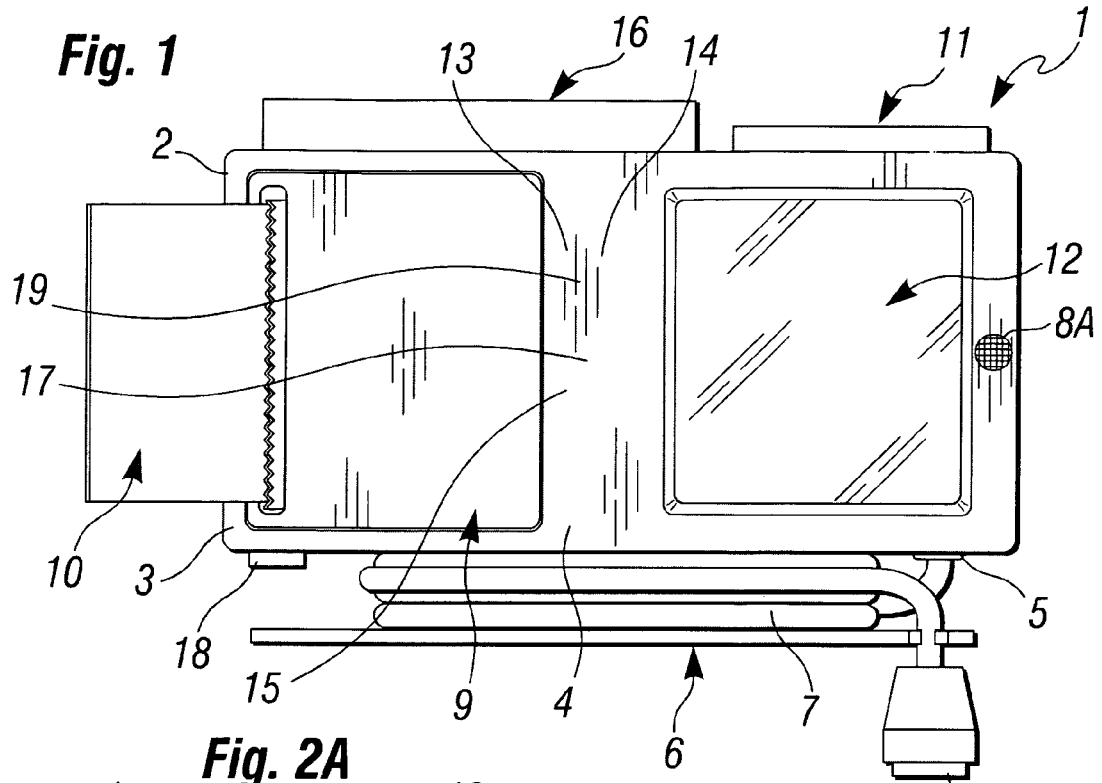
FIG. 1 is a perspective view of the automotive mobile diagnostics.

FIG. 1 illustrates an automotive mobile diagnostics 1. The automotive mobile diagnostics 1 is a handheld OBD2 device comprised of a housing 2 with an exterior 3 and an interior 4. The exterior 3 contains a connector 5 for a data link connector cable (DLC) 7. The housing exterior 3 in the area of the connector 5 has a DLC holder 6 for wrapping the DLC 7 when not in use. The DLC 7 ends with an OBD2 connector 8. The housing exterior has a wireless phone speaker/microphone 8A. The housing interior 4 contains a printer 9 and a roll of printing paper 15 which produce a printout 10. The housing exterior 3 contains a VIN bar code scanner 11. The housing exterior 3 also contains a flat LCD touch screen 12. The housing interior 4 contains a computing device comprising a CPU, RAM, ROM and memory 13. The housing interior 4 houses an internet device 14 for connecting to the internet and a cell phone. The computing device is programmed as an OBD2 code reader/scanner 17. The housing exterior 3 contains an electrical connector 18 connecting to an interior 4 rechargeable battery 19.

Figure 2A:
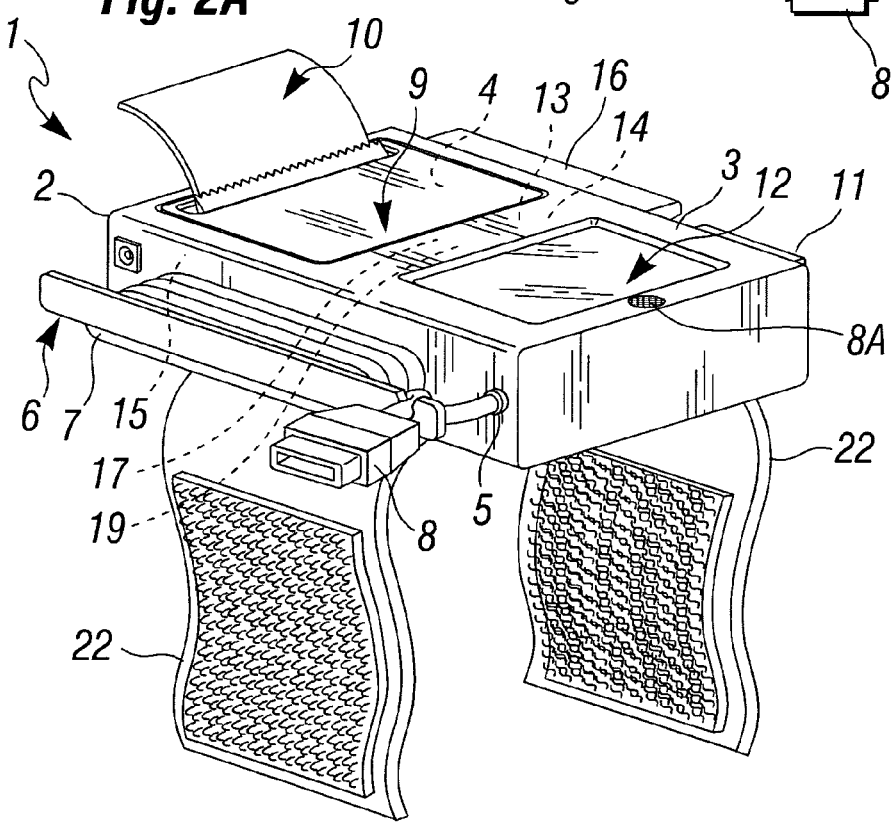
FIG. 2A is a perspective view of the automotive mobile diagnostics.
Figure 2B:
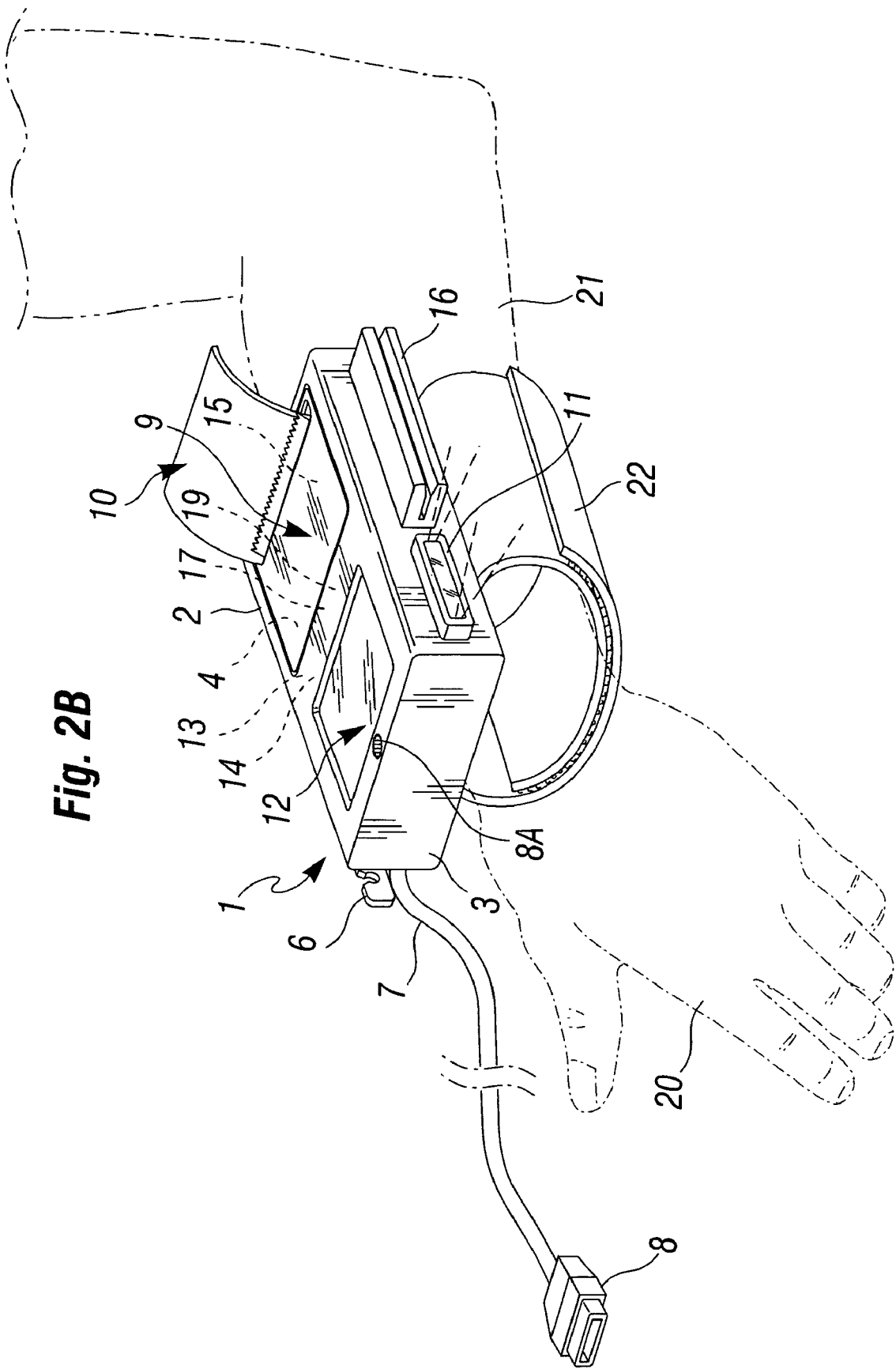
FIG. 2B is a perspective view of the automotive mobile diagnostics.

FIGS. 2A and 2B disclose a preferred embodiment wherein the automotive mobile diagnostics 1 is attached above an operator's hand 20 to the back of arm 21. FIG. 2A disclosed Velcro™ 22 securing the automotive mobile diagnostics 1 to the arm 21.

Figure 3:
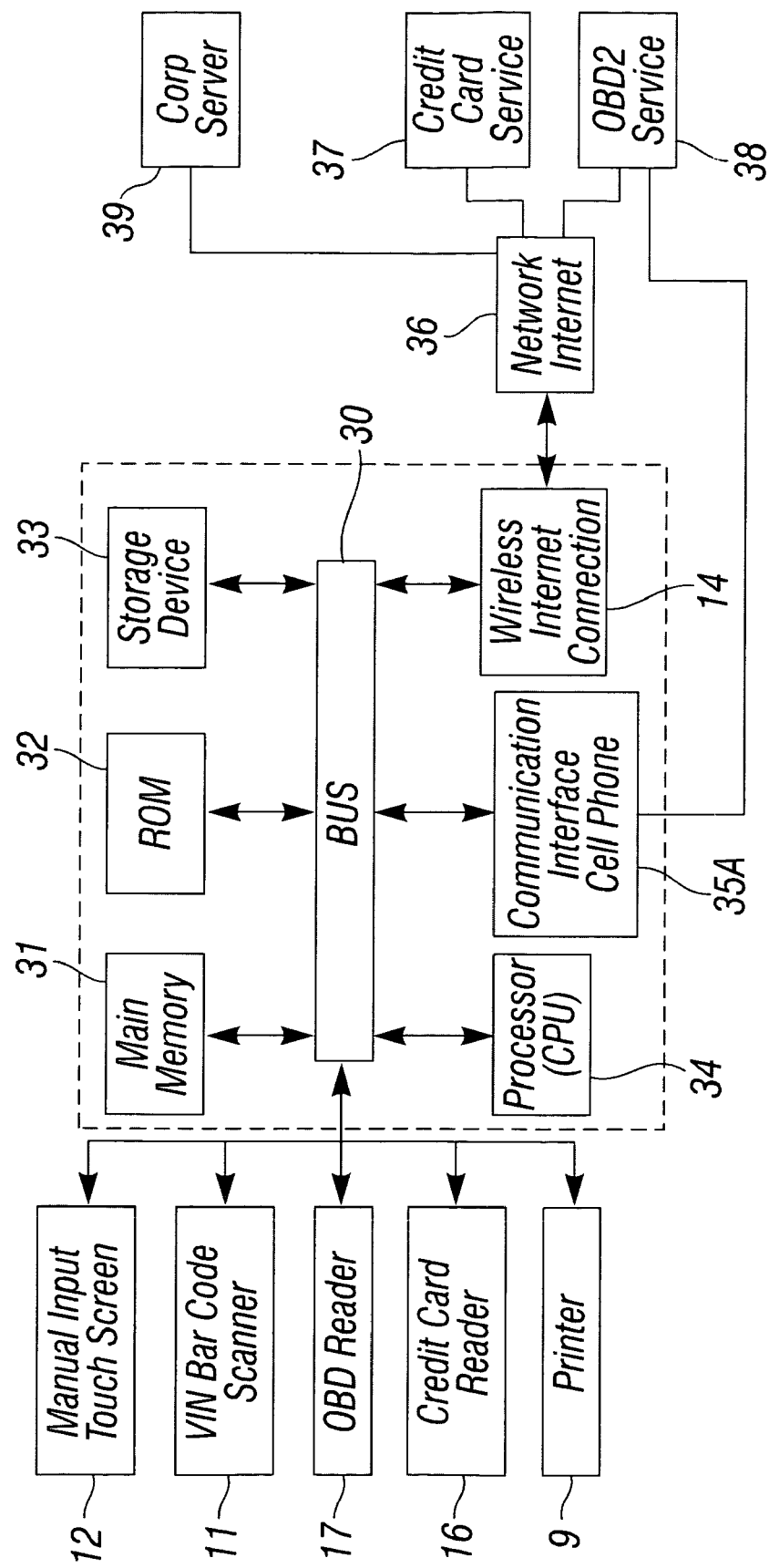
FIG. 3 is a block diagram of automotive mobile diagnostics.

FIG. 3 discloses the interrelationships of the above components. The LCD touch screen 12, VIN number and bar code scanner 11, OBD reader 17, credit card reader 16 and printer 9 interconnect and connect with the computing device 13 BUS 30. The computing device 13 BUS 30 interfaces with the main memory 31, ROM and RAM 32, storage device 33, processor (CPU) 34 and communication interface 35. The communication interface 35 connects with a wireless cell phone 35A and an internet connection 14 which connects with the internet 36. The automotive mobile diagnostics 1 primarily links on the internet 36 to the appropriate credit card server 37 and OBD2 server 38 and live via the wireless cell phone 35 with the operator performing tech support at the OBD2 service 38.

The credit car server 37 will process the customer's credit card and return the transaction information to the automotive mobile diagnostics 1 which can be printed 10 as a receipt for the customer. The OBD2 server 38 will identify the vehicle with the VIN number and return the information to the wherein the automotive mobile diagnostics 1 retrieves the DTCs from the vehicle and which are returned to the OBD2 support which will order the automotive mobile diagnostics to perform any necessary live diagnostic tests. The OBD2 server receives the test results and returns a diagnosis of the automobile's condition to the automotive mobile diagnostics 1 wherein the results may be displayed on the LCD touch screen 12 and the printer 8 may printout 10 the results. A copy of the of the entire transaction, credit card information and automotive information and operator's ID is sent wirelessly to the operator's Corp. server 39.

In a preferred embodiment the code reader/scanner 17 of the automotive mobile diagnostics 1 has enough memory to scan the vehicle VIN code number, or scan the vehicle number, or in the alternative, the operator uses the touch screen keyboard to input the vehicle number, receive manual input of the vehicle number via the touch screen from the operator, identify the vehicle via the OBD2 internet server 38, retrieve diagnostic trouble codes from the vehicle, order and retrieve live data from the vehicle, communicate the retrieved DTCs and live data to OBD2 internet server 38 and receive the diagnosis from the OBD2 internet server 38.

The computing device 13 may be any conventional computer system or any other suitable device or system that computes such as, but not limited to, one or more integrated circuits or packages. As illustrated, the computing device 13 includes a set of parallel conductors called a bus 30 or other communication mechanism for communicating information, and a processor 34 or CPU coupled with the bus 30 for processing information. The processor 34 may include one or more conventional processors, microprocessors, or processing devices as known in the art or may comprise any other suitable device such as, but not limited to, one or more ASICs, one or more DSPs, etc. For instance, the processor 34 may be implemented using an Intel Pentium processor. As illustrated, the computing device 13 also includes main memory 31, such as random access memory (RAM) or other dynamic storage device 33, coupled to the bus 30 for storing information and instructions to be executed by a processor 34. Main memory 31 may be used for storing temporary variable or other intermediate information during execution of instructions to be executed by processor 34. The computing device 13 may further include read only memory (ROM) 32 or other static storage device coupled to bus 30 for storing static information and instructions for processor 34. The storage device 33 is coupled to the bus 30 for storing information and instructions.

With reference to FIG. 3, the computing device 13 is coupled via the bus 30 to a touch screen 12, VIN number and bar code scanner 11, OBD2 reader 17, credit card reader 17 and printer 9.

Although not specifically illustrated, each of the above-listed components may also include any necessary supporting hardware (e.g., circuitry), software and/or firmware that enable the OBD2 reader 16 and its processor 34 to communicate with each component. One or more components may include one or more frame buffers and may further require an additional graphics processing unit and an associated driver stored in main memory 31 or any other suitable memory to alleviate the burden associated with visual reproduction of images that would otherwise be felt by processor 34. The above-listed supporting hardware, software and/or firmware are merely exemplary and are not intended to limit the breadth of the present disclosure.

The manual input touch screen 12B is a LCD display 12A. The touch screen 12B may be a cathode ray tube (CRT), a digital flag panel display (e.g., a plasma display, a LCD display) or any other any suitable display monitor capable of visibly reproducing video and graphic information. The touch screen may be an integrated monitor and manual input device such as any suitable touch screen monitor or any suitable device capable of visibly reproducing video and graphic information and also accepting user input on the same screen 12B. As understood by one having ordinary skill in the art, integrated monitor and the manual input device 12B may accept and detect user input via, for example, physical contact/pressure applied to the screen 12B by way of a human appendage (e.g., an index finger) or a stylus (not illustrated).

In one embodiment, integrated monitor and manual input device 12B provides a graphical user interface having a keyboard layout displayed. Accordingly, a user may input data by using the screen as a keyboard. The integrated monitor and manual input device 12B may allow a user to enter one's signature using a stylus or using one's finger as a writing instrument. The manual input device 12B may have any suitable display screen surface such as, but not limited to, glass or Plexiglas™.

The VIN bar code scanner 11 may be any suitable reader used to obtain OBD system-generated information and VIN information regarding the particular vehicle under test. Regardless of the technology implemented in the VIN bar code scanner 11, the computing device 13 accepts the VIN information read from the VIN bar code scanner 11. If the VIN bar code scanner 11 is incapable of reading the VIN information, a user may manually input the VIN information using the manual input touch screen 12B.

In the preferred embodiment, the VIN reader is a VIN bar code scanner 11. In another embodiment the VIN reader may include an RFID reader programmed to capture information transmitted via an RFID tag or transponder present on the vehicle representing the vehicle's VIN.

In one embodiment, the vehicle pertinent information may include the vehicle's make, model, year, engine size, number of cylinders, etc. and may be associated with the customer name, the last inspection date, etc. However, if no pre-existing entry is found for that particular VIN in the VLT file, then the application may use a decoder to generate the vehicle information from the VIN. Any VIN decoder capable of deciphering and interpreting a VIN can be used to generate the vehicle pertinent information.

With respect to FIGS. 1-3, the OBD2 reader/scanner 17 in a preferred embodiment utilizes the computing device 13 to test vehicle engine and emission components by executing one or more sequences of one or more instruction commands contained in main. Execution of the sequences of instructions contained in the main memory 31 cause the processor 34 to perform the process described herein. The self-service OBD2 reader 17 may be utilized to read and analyze OBD-II computer based systems often termed an Engine Control Unit ("ECU") or a power train Control Module ("PCM") built into vehicles, thereby providing the owner with engine and emission data captured by the vehicle's onboard system.

As recognized, the OBD-II standard allows a variety of electrical signaling protocols indicating how information is transmitted over the vehicle's data link connector (DLC). Known protocols include: SAE J1850 PWM (used by many Ford vehicles), SAE J1850 VPW (used by many GM vehicles), ISO 9141-2 (used by many Chrysler, European and Asia vehicles), ISO 14230 KWP2000, and ISO 15765 CAN. Using one of these protocols, a vehicle can "communicate" with the OBD reader 118.

In one embodiment, vehicle pertinent information includes the OBD-II protocol used by the vehicle. If the VLT includes this information, the OBD reader 17 and/or computing device 13 may be configured to read and/or interpret the OBD related information transmitted over the DLC. In another embodiment, the user may be able to input the protocol used by the vehicle if known. Standard inspection processes may include, among other inspection tests, a KOEO inspection (key-on, engine-off), a KOER inspection (key-on, engine-running) and another other suitable OBD inspection. As understood by those having ordinary skill in the art, diagnostic trouble codes ("DTC"), vehicle readiness codes, parameter identification ("PID") numbers and other suitable OBD-related date may be read by the OBD reader 17 during the inspection process and sent to computing device or to an internet server 38 for analysis of the engine and emission control features of the vehicle and/or storage. In the preferred embodiment the analysis is performed by the remote server allowing the automotive mobile diagnostics 1 to be smaller and more portable.

With respect to FIGS. 1-3, a credit card reader 16 is coupled via the bus 30 for communicating or identifying the credit card or other suitable payment information about the user and vehicle owner to the computing device 13. In one embodiment, the graphical user interface may include a welcome screen instructing the user to insert payment information. In order to begin the engine and emissions inspection, in one embodiment, a credit card may be scanned through a credit card reader 16 as is well known in the art. In response, the automotive mobile diagnostics 1 receives and reads user information credit card information corresponding to vehicle owner. The computing device 13 bus links to a communication interface 35, to an internet connection 14, to the internet and to a credit card server 37. The credit card is charged and the user's account is credited. The information is returned to the user in able to print a receipt.

Referring to FIGS. 1, 2A, 2B and 3, the printer 9 with paper roll 15 is within the interior 4 of the housing 2 and the printer 9 receives communicates from the computing device 13 bus 30. The printer can print 10 a credit card receipt and a vehicle inspection report (VIR) based upon the results of the self-service 013D test.

As in FIGS. 1, 2A and 3 a wireless internet connection 14 is within the interior 4 of the housing 2 of the automotive mobile diagnostics 1. The computing device 13 can send messages, and receive data, including program codes through the network(s), network link 14 and communication interface 35. In the Internet 36 example, a server might transmit a requested code for an application program through the Internet, the ISP, the local network 36 and communication interface 35. The computing device 13 includes a communication interface 35 which provides a two-way data communication coupling to a wireless internet connection 14 that is connected to a network (local or remote) and/or internet 36. For example, communication interface 35 may be an integrated services digital network (ISDN) card or a modem to provide a data communication connection to a corresponding type of telephone line or other suitable transmission line. The communication interface 35 also links to a wireless cell phone 35A.

As another example, communication interface 35 may be a local area network (LAN) card to provide a data communication connection to a compatible LAN. Wireless links and associated circuitry/equipment necessary for implementation ar embodiment. A network link 14 typically provides data communication through one or more networks to other data devices. For example, the network link 14 may provide a connection through a local network to a host computer or to data equipment operated by an Internet Service Provider (ISP). The ISP in turn provides data communication services through the Internet. The local network and Internet both use electrical, electromagnetic, optical or any other suitable signals that carry digital data or data streams. In accordance with this disclosure, one such downloaded application provides for the testing instructions for testing a vehicle's engine and emissions components as described herein. The received code may be executed by processor 30 as it is received, and/or stored in a storage device 33, or other volatile or non-volatile storage for later execution. In this manner, computing device 13 may obtain an application code.

Figure 4:
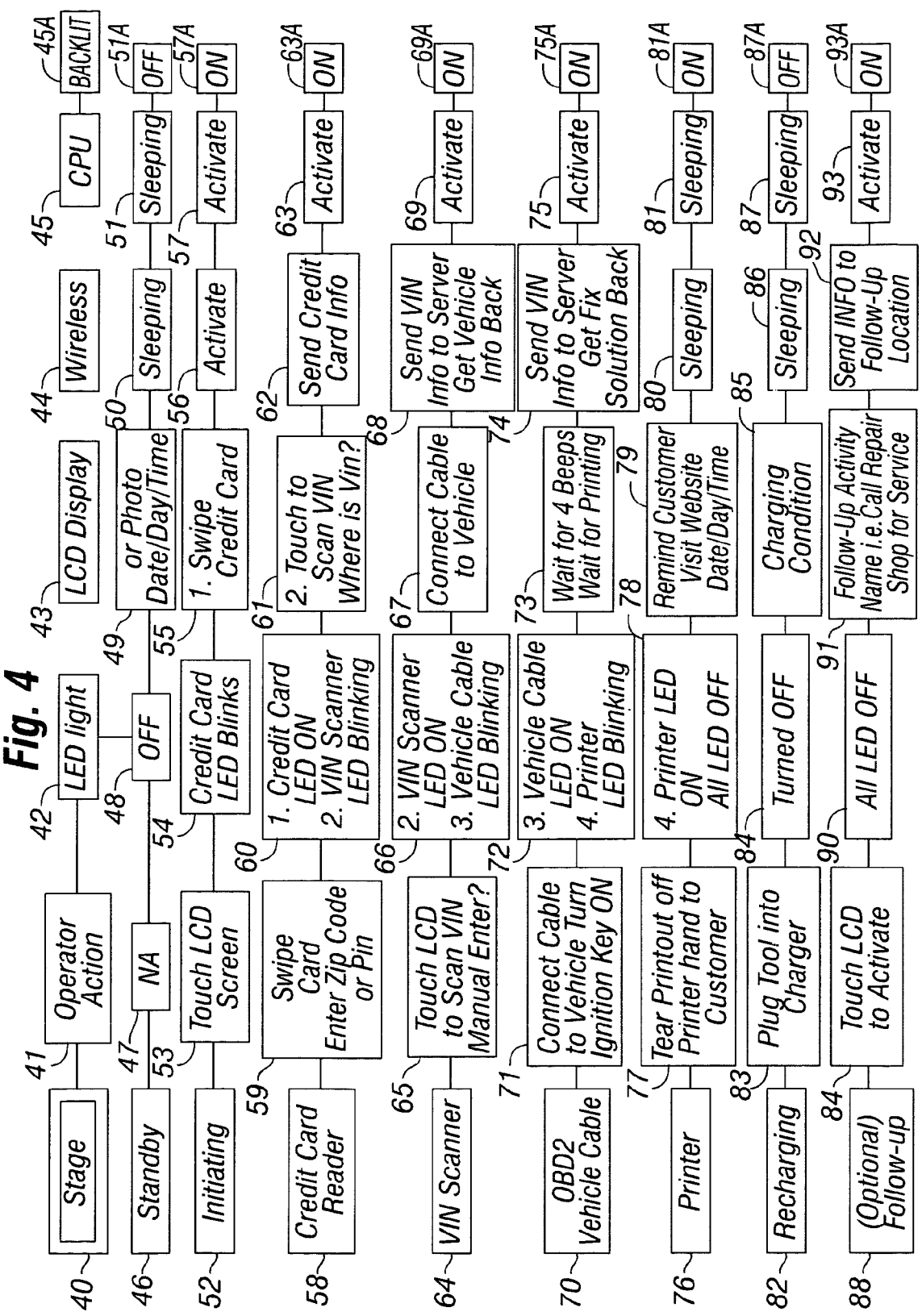
FIG. 4 is a flow chart of the operations of the automotive mobile diagnostics.

Referring to FIG. 4, the an example of the operation of the automotive mobile diagnostics 1 is as follows: The automotive mobile diagnostics 1 operation is described in the following stages 40: standby 46, initiating 52, credit card reader 58, VIN scanner 64, vehicle cable 70, printer 76 and recharging 82. In standby 46 the LED light 42 is off, the LCD display 43 displays the date/day/time 49, the wireless 44 is sleeping 50 and the CPU 45 is sleeping 51 and the screen is not backlit 51A. To initiate 52 the operator 41 touches the LCD screen 53 wherein the wireless 44 is activated 56, the CPU 45 is activated 57, the credit card LED blinks 54 and the LCD displays 4 "sweep the credit card" 55 and the screen is backlit 57A. The next step the credit card reader 58 is activated by sweeping the credit card 59. The credit card LED light 60 is on, the VIN scanner LED is blinking, the LCD displays "touch to scan VIN", the wireless sends credit card information 62 and the CPU is active 63 and the screen is backlit 63A. The VIN scanner 64 is activated by touching the LCD "scan VIN" 65. The "VIN scanner" LED is on 66, the "vehicle cable" LED is blinking 66, the LCD displays "connect cable to vehicle" 67, the wireless sends VIN information to the server 68, the wireless receives vehicle information back from the server 68 and the tool is reprogrammed to be vehicle specific 69 and the screen is backlit 69A. The vehicle cable 70 is the connected to the vehicle 71 and the ignition key is turned on 71. The "vehicle cable" LED is on 72, the vehicle cable LED is on 72, the "printer" LED is blinking 72, LCD display "wait for four beeps" "wait for printing" 73, send vehicle to server and get fix solution back 74 and the CPU is active 75 and the screen is backlit 75A. The printer has now printed 76 and the operator tears off the printout and hands it to the customer 77. The printer LED is on 78, all other LED's are off 78, LCD display: "remind customer to visit website", "day/date/time" 79, wireless is sleeping 80 and CPU is sleeping 81 and the screen is backlit 81A. The internal battery 19 is recharged 82 by plugging in the charger 83. The LED light is off 84, the LCD displays the charging condition 85, the wireless is sleeping 86 and the CPU is sleeping 87 and the screen is not backlit 87A. There is an optional follow-up 88 wherein the operator touches the LCD screen to activate 89, the LCD lights are off 90, follow-up activity i.e. calls service shop for service 91, wirelessly send info to follow up location 92, the CPU is active 93 and the screen is backlit 93A.

Figure 5:
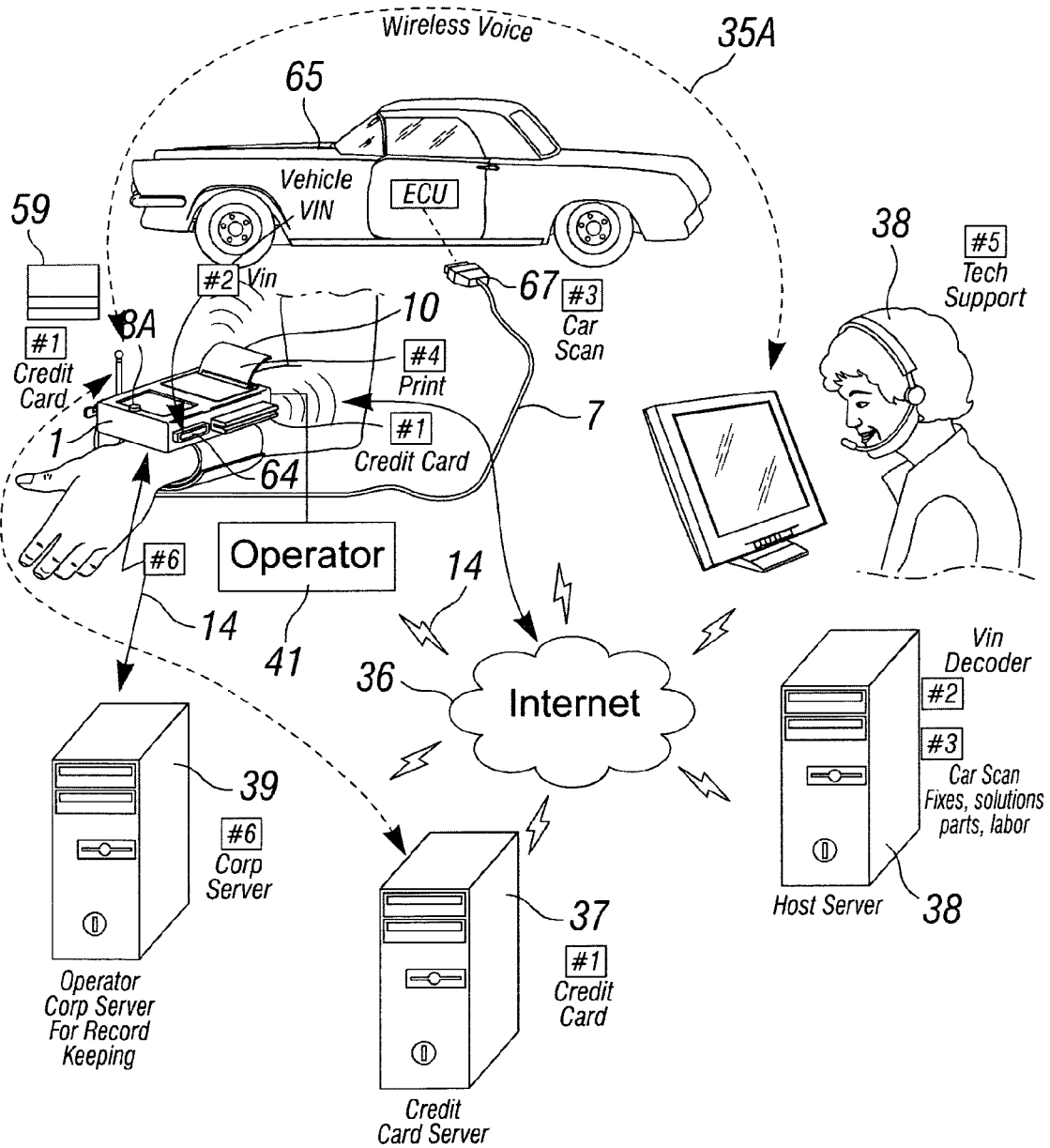
FIG. 5 is a perspective view and flow chart of the use of the automotive mobile diagnostics.

FIG. 5 discloses a summary of the order of using the automotive diagnostic tool 1 and the interrelationship of the various components and servers. The automotive diagnostic tool 1 first is used to scan the credit card 59 and the credit card server 37 is contacted 14 for approval and charges. The VIN number is then scanned and sent 14 to the host server 38 for decoding. The host server 38 then orders the car 65 to be scanned, diagnosed and what is required to fix the automobile along with parts and labor cost estimates. The host server technician 38 may concurrently be contacted by cell phone 35A for tech support. The credit card receipt and automobile diagnostics are printed out 10. The operator 41 then sends 14 the transaction to the Corp. server 39 for record keeping.

The intent of the invention is not to limit its use to a specific sequence of use or only a certain method of information transmission. Examples of variations would be internet messaging with the tech support instead of wireless phone and use of wireless cell phone transmission for credit card transaction instead of internet transmission.

What is claimed is:

1. An automotive mobile diagnostics for interfacing with a vehicle's computer via a diagnostic cable to a vehicle data link connector and for interfacing with a remote server via a wireless or cellular communications means comprising:

a housing with a hollow interior and an exterior wherein the housing is sized to be handheld;

a LCD manual touch input screen on the housing exterior;

a connector on the exterior of the housing configured to connect to a data link connector (DLC) diagnostic cable which connects to the vehicle's data link connector;

a processor in the housing interior containing a database and a diagnostic system programmed to function as an automotive code reader/scanner;

vehicle interface circuitry configured to communicate, via the diagnostic cable, with the vehicle's computer;

a data trouble code (DTCs) reading programming within the processor which reads and retrieves diagnostic trouble codes (DTCs) from the vehicle;

a VIN bar code and number scanner on the exterior of the housing linked to the processor in the interior of the housing wherein the vehicle may be identified;

a credit card reader on the exterior of the housing comprised of a slot on the external of the housing to swipe the credit card wherein credit card information required by the credit card company may be retrieved;

a wireless for accessing local PC internet connection in the internal of the housing linked to the internal processor;

a communication interface wireless for accessing remote server through internet connection in the internal of the housing linked to the internal processor;

a communication interface wireless for accessing remote server through cell phone connection in the internal of the housing linked to the internal processor; and programming in the processor on a computer readable medium to connect via internet and wireless phone with the appropriate servers, computer or PDA and transmit and receive credit card information and automotive diagnostic information, such as identifying the vehicle with its VIN number and diagnosis of the vehicular problem, provides fixes solutions, parts and labor required and the total cost of repair to and from the appropriate server.

2. An automotive mobile diagnostics as in claim 1 wherein a data link connector cable is connected to the connector for the data link connector.

3. An automotive mobile diagnostics as in claim 1 wherein an internal printer with a roll of paper is linked to the internal processor wherein a credit card receipt, a diagnosis of the vehicular problem and a user statement is printed.

4. An automotive mobile diagnostics as in claim 1 wherein a holder is on the exterior of the housing for the data link connector cable when it is not in use.

5. An automotive mobile diagnostics as in claim 1 wherein a securing means to attach the handheld automotive mobile diagnostics to the user, such as a Velcro™ strap for securing to the user's arm.

6. An automotive mobile diagnostics as in claim 1 wherein the screen may be plasma.

7. An automotive mobile diagnostics as in claim 1 wherein there is an internal rechargeable battery with a female electrical on the external of the housing for connection with an external power source.

8. An automotive mobile diagnostics as in claim 1 wherein there is an external speaker/microphone.

9. An automotive mobile diagnostics for interfacing with a vehicle's computer via a diagnostic cable to a vehicle data link connector and for interfacing with a remote server via a wireless or cellular communications means comprising:
   a housing with a hollow interior and an exterior wherein the housing is sized to be handheld;
   a LCD manual touch input screen on the housing exterior;
   a connector on the exterior of the housing configured to connect to a data link connector (DLC) diagnostic cable which connects to the vehicle's data link connector;
   a processor in the housing interior containing a database and a diagnostic system programmed to function as an automotive code reader/scanner;
   vehicle interface circuitry configured to communicate, via the diagnostic cable, with the vehicle's computer;
   a data trouble code (DTCs) reading programming within the processor which reads and retrieves diagnostic trouble codes (DTCs) from the vehicle;
   a VIN bar code and number scanner on the exterior of the housing linked to the processor in the interior of the housing wherein the vehicle may be identified;
   a credit card reader on the exterior of the housing comprised of a slot on the external of the housing to swipe the credit card wherein credit card information required by the credit car company may be retrieved;
   a wireless for accessing local PC internet connection in the internal of the housing linked to the internal processor;
   a communication interface wireless for accessing remote server through internet connection in the internal of the housing linked to the internal processor;
   a communication interface wireless for accessing remote server through cell phone connection in the internal of the housing linked to the internal processor; and
   programming in the processor on a computer readable medium to connect via internet and wireless phone with the appropriate servers, computer or PDA and transmit and receive credit card information and automotive diagnostic information, such as identifying the vehicle with its VIN number and diagnosis of the vehicular problem, to and from the appropriate server; and provides fixes solutions, parts and labor required and the total cost of repair to and from the appropriate server; and
   an internal printer with a roll of paper is linked to the internal processor wherein a credit card receipt, a diagnosis of the vehicular problem and a user statement be printed.

10. An automotive mobile diagnostics as in claim 9 wherein a holder is on the exterior of the housing for the diagnostic cable when the diagnostic cable is not in use.

11. An automotive mobile diagnostics as in claim 9 wherein a securing means to attach the handheld automotive mobile diagnostics to the user, such as a Velcro strap for securing to the user's arm.

12. An automotive mobile diagnostics as in claim 9 wherein the screen may be plasma.

13. An automotive mobile diagnostics as in claim 9 wherein there is an internal rechargeable battery with a female electrical connector on the external of the housing for connection with an external power source.

14. An automotive mobile diagnostics as in claim 9 wherein a securing means to attach the handheld automotive mobile diagnostics to the user, such as a Velcro™ strap for securing to the user's arm.

15. An automotive mobile diagnostics as in claim 9 wherein there is an external speaker/microphone.

16. The method of using an automotive mobile diagnostics comprising the following method steps:
   touching the LCD screen to initiate the automotive mobile diagnostics;
   swiping a credit card to download credit card information;
   establishing internet contact with the credit card server;
   sending the credit card information, ZIP code, PIN and charges to the credit card server;
   receiving credit card approval and transaction receipt from the credit card server;
   printing a credit card transaction receipt;
   connecting with the OBD2 server via the internet;
   calling the OBD2 server technician via the wireless cell phone if any necessary live conversation;
   scanning the automobile VIN number and VIN bar code;
   sending VIN information to the server;
   receiving vehicle information from the server;
   reprogramming the automotive mobile diagnostics vehicle specific;
   connecting the DTC cable to the vehicle;
   turning the vehicle ignition key on;
   receiving vehicle diagnostic information from the vehicle;
   sending vehicle information to the server;
   speaking with the technician, if necessary;
   receiving diagnostic and repair information from the internet automotive server;
   printing the diagnostic and repair information for the automobile;
   handing the printed report to the customer;
   contacting a repair garage;
   sending information to the repair garage; and
   sending transaction information to the operator's Corp. for record keeping.

17. The method of using an automotive mobile diagnostics as in claim 16 further comprising the following method step of sending the VIN number and automobile diagnostic information to a personal computer and receiving a diagnostic and repair information back from the personal computer.

18. The method of using an automotive mobile diagnostics as in claim 16 further comprising the following method step of sending the VIN number and automobile diagnostic information to a PDA and receiving diagnostic and repair information back from the PDA.

19. The method of using an automotive mobile diagnostics as in claim 16 further comprising the following method step of the remote server flagging the deviant live data parameters (PIDS) received from the automobile.

20. The method of using an automotive mobile diagnostics as in claim 16 further comprising the following method step of the OBD2 remote server pricing an estimate for the repair.

* * * * *